UNITED STATES PATENT OFFICE.

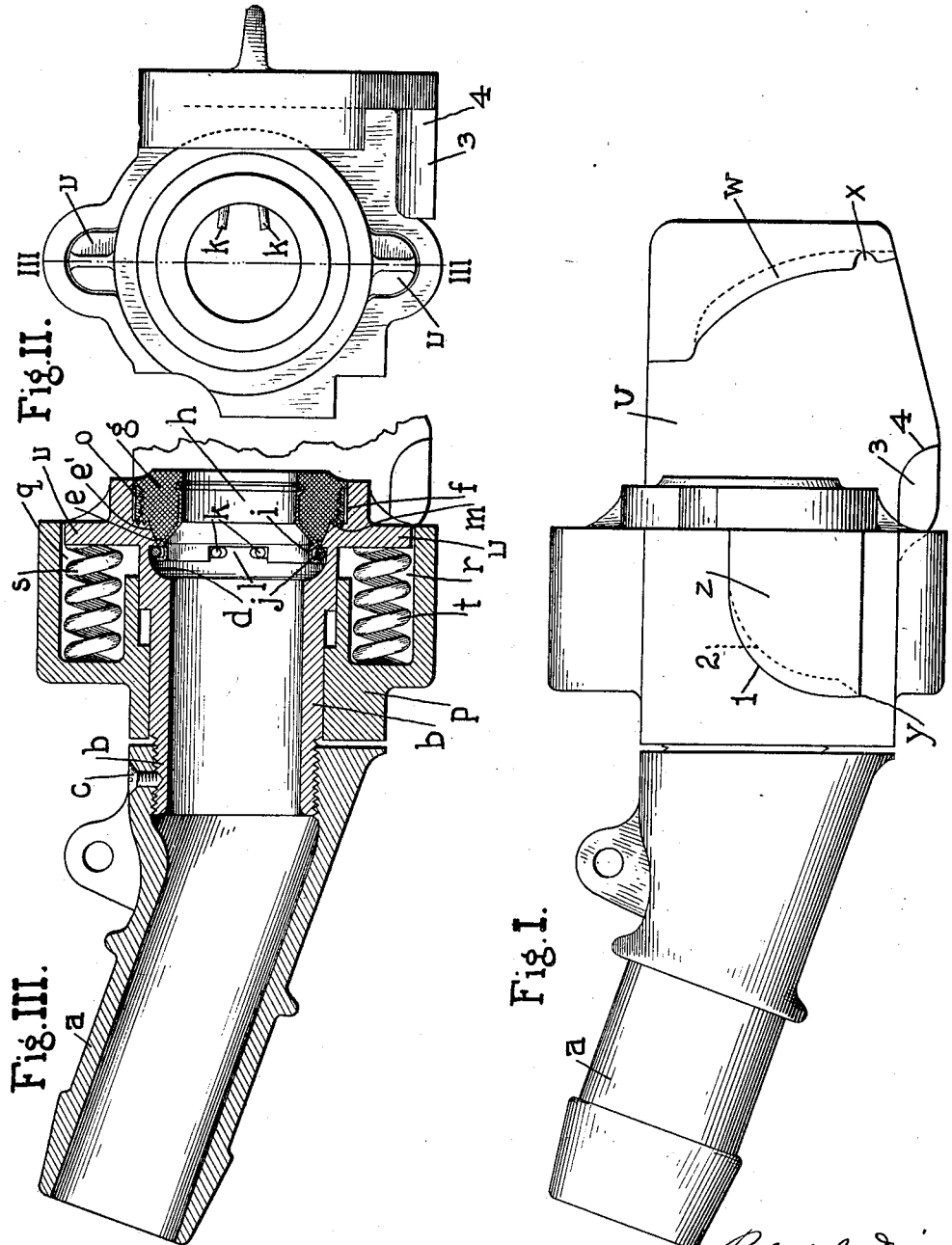

ROBERT M. DIXON, OF EAST ORANGE, NEW JERSEY, ASSIGNOR TO THE SAFETY CAR HEATING & LIGHTING COMPANY, A CORPORATION OF NEW JERSEY.

HOSE-COUPLING.

No. 887,234.　　Specification of Letters Patent.　　Patented May 12, 1908.

Application filed August 4, 1904. Serial No. 219,496.

*To all whom it may concern:*

Be it known that I, ROBERT M. DIXON, a citizen of the United States, residing at East Orange, county of Essex, and State of New Jersey, have invented certain new and useful Improvements in Hose-Couplings, of which the following is a specification.

My invention relates to a new and improved coupling for steam hose in car heating. In the accompanying drawing, I have shown a construction in which one form of my invention is embodied, the same being that form of my invention which I at present consider the best embodiment, it being understood, however, that this form is illustrative merely and that I do not limit my invention thereto but desire to include within my claims any analogous structures which may be justified by the state of the art and it is with this understanding that I desire my claims construed.

In the drawing, Figure I is a side elevation of one member of a hose coupling in which my invention is embodied, it being understood that I preferably employ two similar members to constitute the coupling; Fig. II is a face or end view of the coupling member; and Fig. III is a longitudinal vertical section on line III—III of Fig. II.

The main object of my invention is to produce a coupling in which the compressions of strain are received by springs under compression so as to compensate for wear and other deteriorating influences, and produce an even pressure over the faces of the gaskets thus differentiating from a single spring around the shank of the coupling.

In the embodiment of my invention shown in the drawing, I have shown a plurality of springs arranged so as to bring an even pressure between the bearing surfaces of the gaskets. Two springs on opposite sides are shown. Three springs might be used in which case they should be spaced at angles of 120 degrees with each other.

For the purposes of this specification, it may be assumed that the plane indicated by the section line III—III in Fig. II is the plane of hang of the coupling and train pipe.

Referring now to the drawing, $a$ indicates any ordinary tubular portion of the coupling member adapted to be secured to the flexible train pipe. I have shown a sleeve $b$ screw-threaded therein and preferably held in place by a screw $c$ or other securing means. This sleeve $b$ constitutes the body of the coupling and is recessed at its front portion to receive a gasket and its securing means. In the present instance, I have shown this sleeve or body portion as provided with an annular recess $d$ with a shouldered portion $e$ and a recess $f$.

The gasket $g$ rests against the face of the coupler head and is contained within the recess $f$ bearing against the inclined face $e'$ of the shouldered portion $e$. The shouldered portion is herein shown as of annular form. The gasket $g$ is herein shown as a composition gasket molded upon a sheet metal ring $h$ recessed at $i$ for the reception of a locking member herein shown as an annular spring $j$ having its ends $k$ protruding inwardly through the slotted portion $l$ of the sheet metal ring $h$. The front face of the coupler body is preferably scored as at $m$ to afford a better grip on the gasket, which gasket is also preferably provided with a wear ring or plate $o$ scored internally and embedded in the gasket.

A movable sleeve $p$ surrounds the coupler body $b$ and is recessed at $q$ and $r$ for the reception of springs $s$ and $t$. The sleeve $p$ is freely movable on the body $b$ of the coupler member, which body portion is provided with lugs $u$ against which the springs $s$ and $t$ bear. These springs $s$ and $t$ are located along the line III—III and when the coupler is in its normal position, will exert their pressure evenly to push the gasket faces together.

By thus constructing the coupling, I am enabled to effect the act of coupling by swinging the coupler members in a vertical plane as has been heretofore practiced on railroads.

For the purpose of locking the coupler members together, I have provided each coupler member with complemental locking means. One member of this locking means comprises a side arm $v$ having a curved hook-shaped face $w$ notched at $x$ to receive the point $y$ of a side lug or bead $z$ of the complemental coupler member. This side lug $z$ is provided with a curved edge 1 undercut as indicated at 2 to coöperate with the undercut portion of the hook-shaped edge $w$.

It will be obvious that when the coupler members are brought together in the ordinary act of coupling, the cam surfaces $w$ and 1 will cause compression of the springs $s$ and $t$ and the gaskets will be held firmly face to face, the springs taking up the shrinkage due to wear of gaskets and other causes and the coupler members being firmly locked together by the engagement of the lug or bead in the recess x.

The act of uncoupling can, of course, be readily accomplished as heretofore, both movements being in substantially the plane of the coupling.

Having described my invention, what I claim and desire to secure by Letters Patent is:—

1. In a coupling, the combination of a body, a suitable gasket combined therewith, and a spring controlled sliding connecting device having complemental engaging means for engaging another coupling, the said spring controlled sliding connecting device being comprised in part by independent springs arranged upon diametrically opposite sides of the coupling body and lying in a plane at right angles to the plane in which lie the complemental engaging means.

2. In a hose coupling, in combination, a coupler body, a member thereon provided with complementary engaging means, and springs combined with said member, said springs being arranged in a plane at right-angles to the plane of said engaging means.

3. In a gravity hose coupling, in combination, a coupler body, and a spring-controlled member provided with complementary engaging devices adapted to slide thereon, the springs thereof being arranged in a single diametrical plane and in the plane of the hang of said coupling.

4. In a hose coupling, in combination, a coupler body, a movable connecting member thereon having a plurality of springs arranged in one diametrical plane, and complementary engaging means arranged in a plane at right-angles thereto.

5. In a device of the class described, in combination, a coupler body, a connecting member provided with complementary engaging means arranged in a horizontal plane and a plurality of resilient means operating upon said connecting member, said resilient means being arranged in a vertical plane.

6. In a hose coupling, in combination, a flanged coupler member, a sleeve slidably mounted thereon having a locking arm on one side and a locking projection on its opposite side adapted to engage and couple with similar locking devices upon the reciprocal coupler member by a downward swinging movement, and a pair of springs interposed between the flange of said coupler member and said sleeve, said springs being arranged upon opposite sides of said coupler member and located in a plane at right angles to the plane of said locking arm and projection.

ROBERT M. DIXON.

Witnesses:
 F. E. KESSINGER,
 ELMER E. ALLBEE.